US007630024B2

(12) United States Patent
Klein

(10) Patent No.: US 7,630,024 B2
(45) Date of Patent: *Dec. 8, 2009

(54) ASSEMBLIES AND METHODS FOR ILLUMINATING A DISPLAY

(75) Inventor: Dean A. Klein, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 224 days.

This patent is subject to a terminal disclaimer.

(21) Appl. No.: 11/520,225

(22) Filed: Sep. 13, 2006

(65) Prior Publication Data

US 2007/0008453 A1 Jan. 11, 2007

Related U.S. Application Data

(63) Continuation of application No. 11/215,237, filed on Aug. 30, 2005, now Pat. No. 7,110,060, which is a continuation of application No. 08/835,732, filed on Apr. 11, 1997, now Pat. No. 6,992,733.

(51) Int. Cl.
*G02F 1/1333* (2006.01)
*G02F 1/1335* (2006.01)

(52) U.S. Cl. .......................................... 349/58; 349/65
(58) Field of Classification Search ............. 349/58–67; 362/30, 32
See application file for complete search history.

(56) References Cited

U.S. PATENT DOCUMENTS

| | | | |
|---|---|---|---|
| 4,876,537 A | 10/1989 | Oyamada | |
| 4,916,580 A | 4/1990 | Sano et al. | |
| 5,008,658 A | 4/1991 | Russay et al. | |
| 5,050,946 A | 9/1991 | Hathaway et al. | |
| 5,099,343 A * | 3/1992 | Margerum et al. | ............ 349/63 |
| 5,128,781 A | 7/1992 | Ohno et al. | |
| 5,134,548 A | 7/1992 | Turner | |
| 5,211,463 A | 5/1993 | Kalmanash | |
| 5,293,262 A | 3/1994 | Adachi et al. | |
| 5,548,271 A | 8/1996 | Tsuchiyama | |
| 5,579,134 A | 11/1996 | Lengyel | |
| 5,648,827 A | 7/1997 | Shaw | |
| 5,661,578 A | 8/1997 | Habing et al. | |
| 5,708,487 A * | 1/1998 | Bergman | ...................... 349/63 |
| 5,709,463 A | 1/1998 | Igram | |
| 5,719,649 A | 2/1998 | Shono et al. | |
| 5,844,773 A | 12/1998 | Malhi | |
| 6,300,944 B1 | 10/2001 | Parrish | |
| 6,992,733 B1 | 1/2006 | Klein | |
| 7,110,060 B2 * | 9/2006 | Klein | ........................ 349/58 |

OTHER PUBLICATIONS

Technical Data AA10SA6C-ADDD Mitsubishi Flat Panel Display, Apr. 10, 1996.
NEC TFT Color LCD Module, Nov. 21, 1995.

* cited by examiner

*Primary Examiner*—Dung T. Nguyen
(74) *Attorney, Agent, or Firm*—Knobbe Martens Olson & Bear LLP

(57) ABSTRACT

A computer display is disclosed. The computer display includes a LCD housing, a light source coupled to the LCD housing, and a LCD coupled to the LCD housing. The LCD housing conducts light from the light source to the LCD. A method for conducting light is also disclosed. The method includes generating light and conducting the generated light through a LCD housing.

20 Claims, 8 Drawing Sheets

ASSEMBLIES AND METHODS FOR ILLUMINATING A DISPLAY

RELATED APPLICATIONS

This application is a continuation of, and claims priority benefit under 35 U.S.C. § 120 from, U.S. patent application Ser. No. 11/215,237, filed on Aug. 30, 2005, now U.S. Pat. No. 7,110,060 which is a continuation of U.S. patent application Ser. No. 08/835,732, filed on Apr. 11, 1997, now U.S. Pat. No. 6,992,733, issued Jan. 31, 2006, each of which is hereby incorporated herein by reference in its entirety.

BACKGROUND OF THE INVENTION

1. Field of the Invention

The present invention relates generally to flat panel display systems. More particularly, the present invention relates to methods and apparatus for backlighting a liquid crystal display (LCD). Even more particularly, the present invention relates to backlighting a LCD on a laptop computer.

2. Description of the Related Art

A conventional laptop computer, such as the laptop computer shown in FIG. 1, utilizes a "fliptop" display to display computer data. The fliptop display is generally perpendicular to the body of the laptop computer when the laptop is in use, allowing the user to view the displayed computer data. When the laptop computer is not in use, the fliptop display is folded down into a closed position so that it is substantially parallel to the body of the computer.

The prior art fliptop display assemblies include a LCD housing. The LCD housing is typically hinged to the body of the laptop computer and generally operates as a protective cover for the LCD module.

Prior art fliptop displays also include a LCD module. The LCD module includes a LCD and a means for "backlighting" the LCD. Backlighting refers to generating light behind the LCD and uniformly projecting it through the LCD. Prior art backlighting techniques generally involve the use of a light source and a light pipe composed of light transmissive material located adjacent to the LCD. U.S. Pat. No. 5,050,946, which is incorporated herein by reference, discusses various light source and light pipe designs.

A cross sectional view of a conventional fliptop display 2 is shown in FIG. 2. As shown in FIG. 2, the conventional fliptop display 2 includes a LCD housing 10 and a LCD module 15. The LCD housing 10 is composed of an opaque material (usually plastic) and protects the LCD module 15. The LCD module 15 is secured within the LCD housing 10 by various common securing means, such as screws, clips, or other frictionally engaging or interlocking means (not shown). Referring again to FIG. 2, the LCD housing 10 has a rear portion 12 and top and bottom portions 11.

Referring again to FIG. 2, the LCD module 15 includes a LCD 20, a light source 25, and a light pipe 30. The aperture 26 of the light source 25 is aligned adjacent to an end of the light pipe 30. As shown in FIG. 2, the light pipe 30 is adjacent to the back surface 21 of the LCD 20. The LCD 20 is backlit when light generated by the light source 25 is conducted through the light source aperture 26 and coupled into an end of the light pipe 30. As shown in U.S. Pat. No. 5,050,946, the coupled light may be uniformly diffused throughout the light pipe 30, and projected toward the back surface 21 of the LCD 20. Some conventional LCD modules utilize a light pipe 30 with a light-reflective coating applied to the back side 31 of the light pipe 30 (not shown). In this manner, light incident upon the back surface 31 of the light pipe 30 will be reflected back into the light pipe 30 for projection toward the LCD 20.

As shown in FIG. 2, the length of the top and bottom portions 11 of the LCD housing 10, and hence the depth D of the fliptop display 2, are roughly defined by the combined thickness of the rear portion 12 of the LCD housing 10 and the LCD module 15.

As shown in FIG. 3, the depth D of the fliptop display 2 is at least the sum of the thickness d1 of the rear portion 12 of the LCD housing 10, the diameter d3 of the light source 25, and some fractional portion of the thickness d5 of the LCD 20. In situations where the diameter d3 of the light source 25 is equal to the thickness d4 of the light pipe 30, the depth D may be the sum of the thicknesses d1, d3 (or d4), and d5.

For example, thickness d1 of the rear portion 12 of the LCD housing 10 may be 4 mm, the diameter d3 of the light source 25 may be 4 mm and the thicknesses d4 and d5 of the light pipe 30 and the LCD 20 may be 2 mm. As shown in FIG. 3, these dimensions will result in the light source 25 extending 1 mm on either side of the light pipe 30. It can be seen that for this configuration of components, the depth D of the fliptop display 2 will be at least 9 mm and the thickness d2 of the LCD module 15 will be 5 mm. In situations where the diameter d3 of the light source 25 is equal to the thickness d4 of the light pipe 30, the depth D of the fliptop display 2 will be 8 mm and the thickness d2 of the LCD module 15 will be 4 mm.

In the laptop computer industry, it is always desirable to reduce the size and weight of the laptop computer and its component parts. It is also desirable to minimize the number of parts. Thus, there exists a need for a thinner, less complex, and lighter fliptop display.

SUMMARY OF THE INVENTION

One embodiment of the present invention is a computer display. The computer display includes a LCD housing, a light source coupled to the LCD housing, and a LCD coupled to the LCD housing. In this embodiment, the LCD housing conducts light from the light source to the LCD.

Another embodiment of the invention is a method for conducting light. The method includes generating light and conducting the generated light through a LCD housing.

DETAILED DESCRIPTION OF THE PREFERRED EMBODIMENTS

Figure 1:
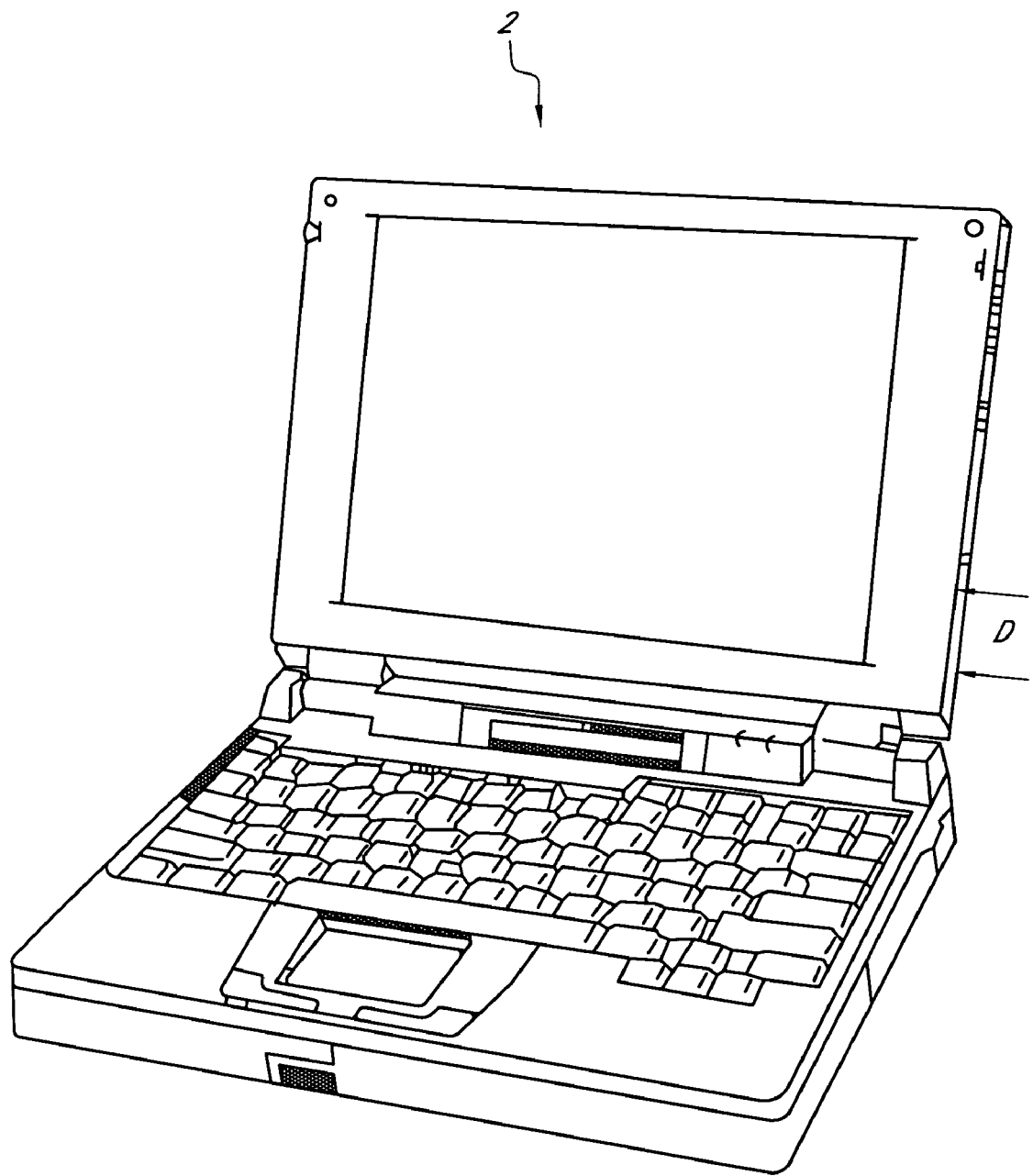
FIG. 1 illustrates a perspective view of a laptop computer.
Figure 2:
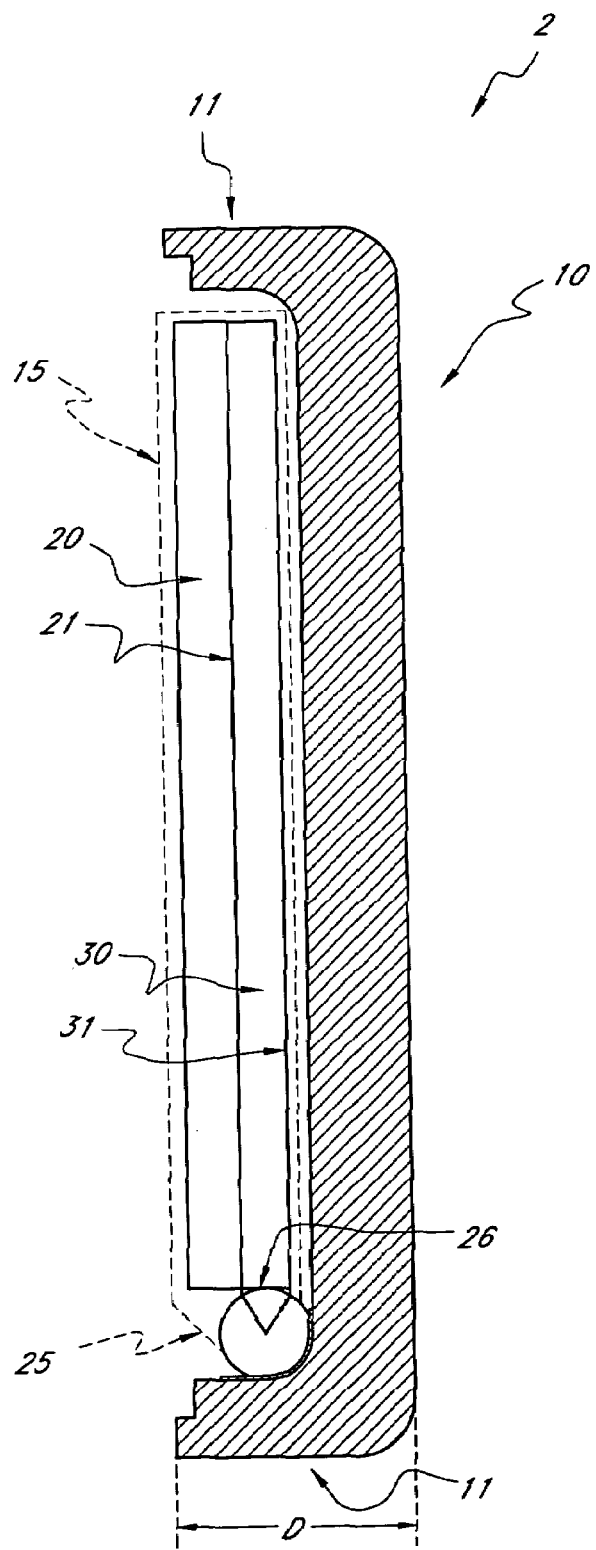
FIG. 2 is a cross sectional view of a prior art fliptop display for a laptop computer.
Figure 3:
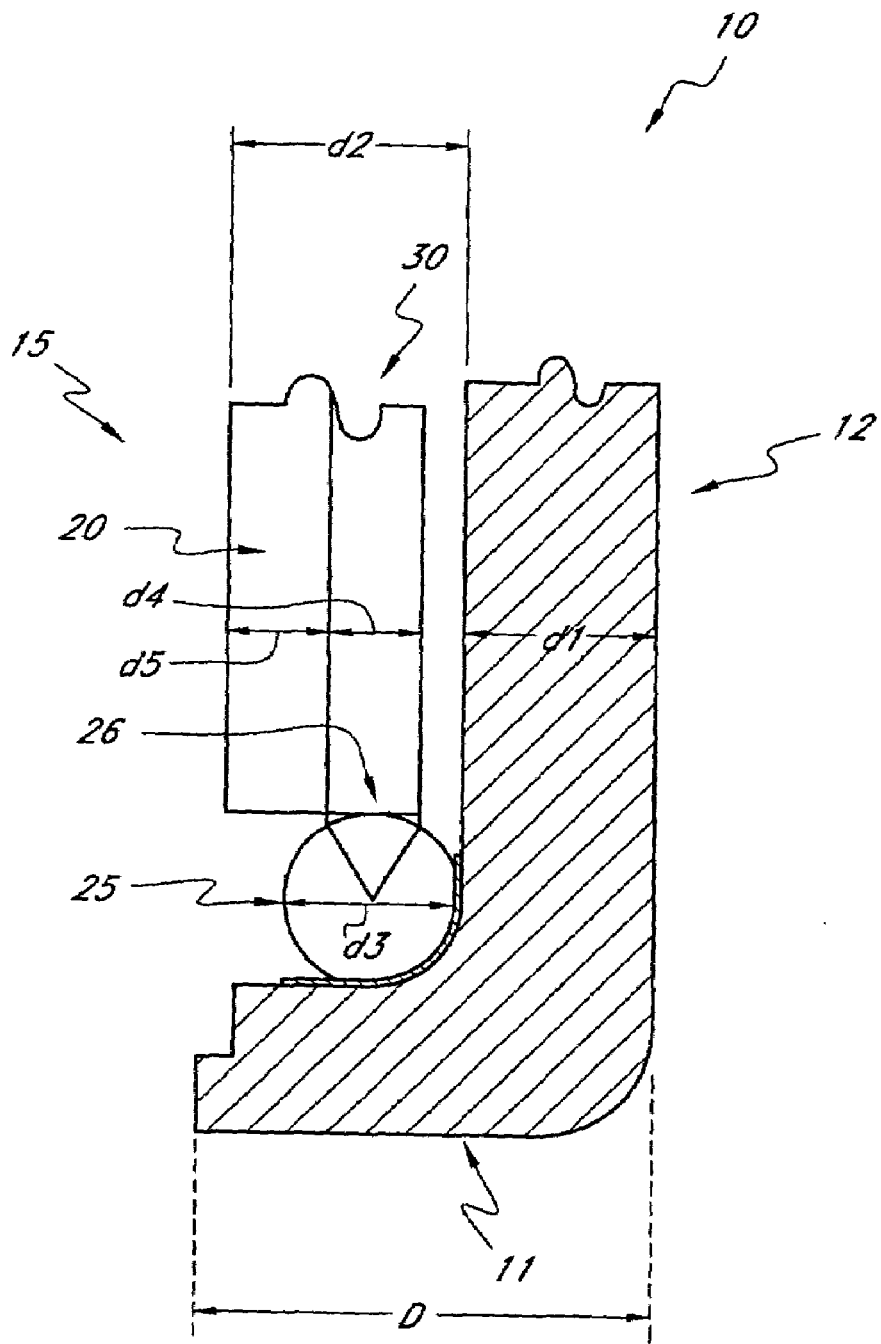
FIG. 3 is a close up view of the lower portion of FIG. 2.
Figure 4:
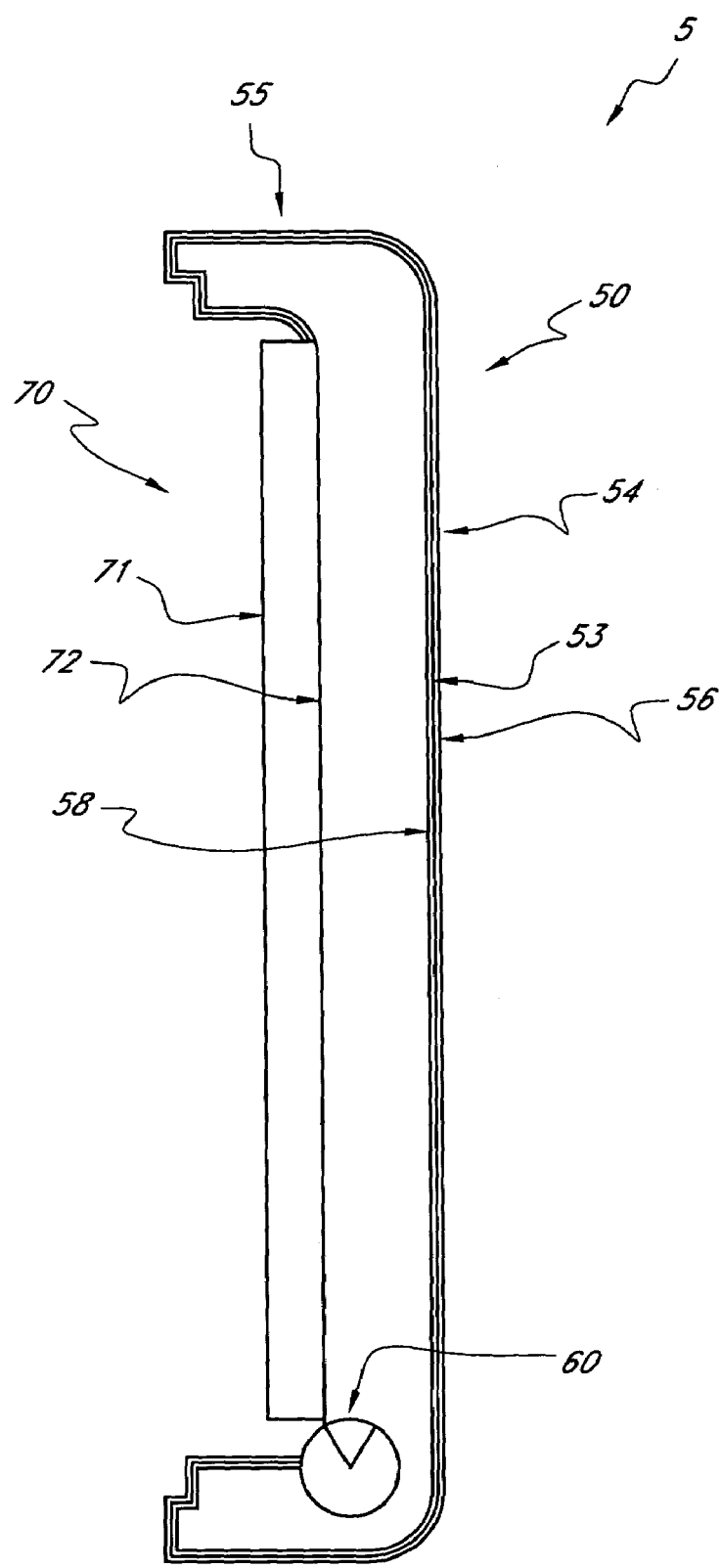
FIG. 4 is a cross sectional view of a novel fliptop display of a laptop computer.

FIG. 4 illustrates a cross sectional view of a novel fliptop display 5. The fliptop display 5 includes a planar LCD module 70 and a generally planar LCD housing 50. The LCD module 70, which includes a planar LCD 71, is secured in the LCD housing 50 by various common securing means, such as screws, clips, or other frictionally engaging or interlocking means (not shown).

The LCD housing 50 is composed of a translucent material that functions as a light pipe. For example, the LCD housing 50 may be formed from an ABS plastic such as Lexan™ from General Electric. The LCD housing 50 may include a planar rear portion 54 and top and bottom portions 55. As shown in FIG. 4, a light source 60 may be partially embedded in or enclosed in the LCD housing 50. The light source 60 may be secured in the LCD housing 50 by friction fit or by various common securing means, such as screws, clips, or other frictionally engaging or interlocking means (not shown). The LCD housing 50 may also have a light-reflective coating 53 applied to its outer surface 58. The light-reflective coating 53 may be composed of aluminum or a variety of metallic or other reflective substances. The light-reflective coating 53 reflects light incident upon it back into the LCD housing 50 for projection to the LCD module 70. The reflective coating 53, when made of materials such as electroless chrome followed by forty to fifty (inches) of copper, then nickel plating of ten (inches) may also operate to minimize EMI emissions from the fliptop display 5. Alternatively, a nickel-copper-nickel plating may be utilized. Because the reflective coating 53 forms the outer surface 58 of the housing 50, it may be desirable to cover it or paint it with a protective layer 56 composed of a material such as soft touch polyethylene paint, that resists scratching and preserves its desired optical qualities.

During operation of the fliptop display 5, the light source 60 generates light. This light is conducted through the LCD housing 50. The conducted light is then projected into the back surface 72 of the LCD module 70.

Figure 5:
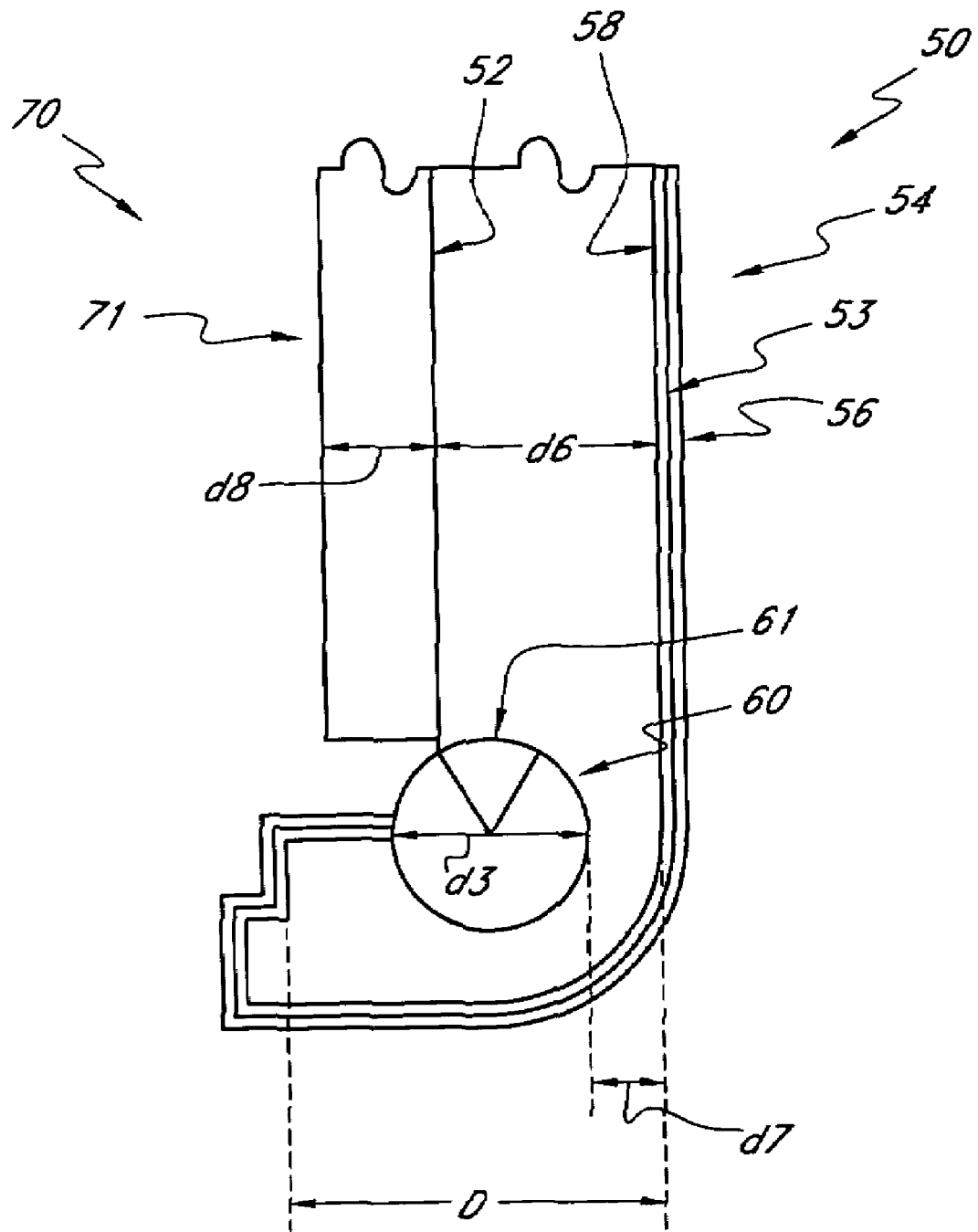
FIG. 5 is a close up view of the lower portion of FIG. 4.

FIG. 5 shows a close-up view of the lower portion of FIG. 4. In FIG. 5, the rear portion 54 of the LCD housing 50 has a thickness d6. The fractional portion of the LCD housing 50 between its outer surface 58 and the light source 60 has a thickness d7. (The light-reflective coat 53 and its protective layer 56 add a negligible thickness). The light source 60 depicted in FIG. 5 is a cold cathode fluorescent lamp that has a diameter d3. For maximum light coupling, the cold cathode fluorescent lamp 60 may be embedded in the LCD housing 50 so that the aperture 61 of the cold cathode fluorescent lamp 60 is completely adjacent to the LCD housing 50. The LCD module 70, which has a thickness d8, may be adjacent to the inner surface 52 of the LCD housing 50. Thus, it can be seen from FIG. 5, that the depth D of the fliptop display 5, closely approximates the sum of the thickness d7 of the fractional portion of the LCD housing 50 between its outer surface 58 and the light source 60, the diameter d3 of the light source, and some fraction of the thickness d8 of the LCD module 70. It can also be seen that the depth D of the fliptop display 5 closely approximates the sum of the thickness d6 of the rear portion 54 of the LCD housing 50 and the thickness d8 of the LCD 71.

For example, using the dimensions previously discussed for these components, the thickness d8 of the LCD 71 is 2 mm and the thickness d6 of the LCD housing 50 is four millimeters. To provide maximum light coupling, the light source 60 with a two-millimeter aperture 61 will be embedded in the LCD housing 50 so that one millimeter of diameter protrudes from the assembly. Accordingly, the thickness d7 will be one millimeter, and the fraction of the thickness d8 contributing to the depth D of the fliptop display 5 will be one millimeter. Thus, it can be seen that the depth D of the fliptop display 5 is now six millimeters. This depth D is 25% less than the depth of conventional fliptop displays.

Figure 6:
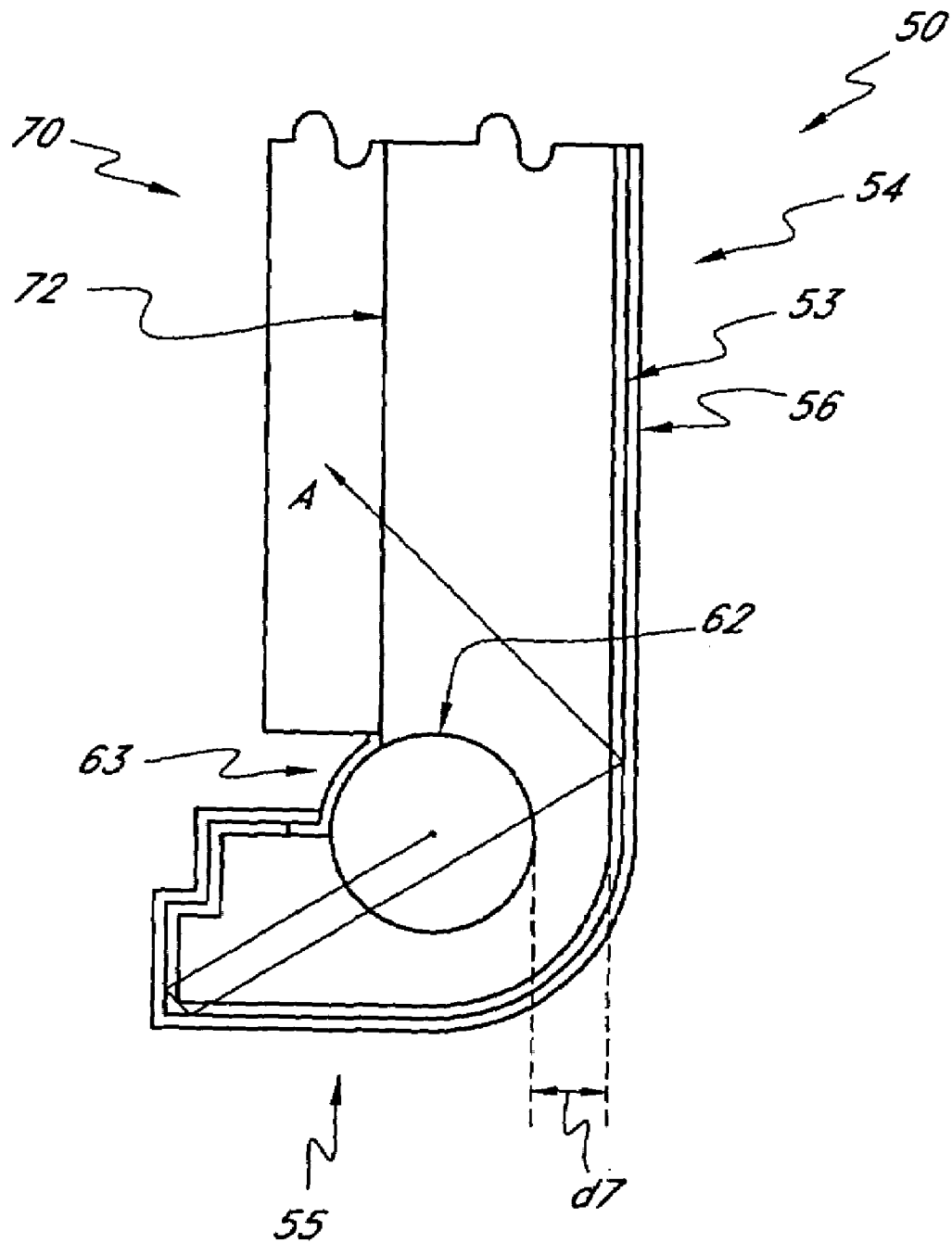
FIG. 6 is a close up view of an alternative embodiment of the lower portion of FIG. 4.

Another embodiment of the present invention is shown in FIG. 6. This embodiment includes an omnidirectional light source 62. A reflector 63 is used to direct incident light generated by the omnidirectional light source 62 back into the LCD housing 50. As shown by the path traveled by light ray A, the light-reflective coating 53 will internally reflect light conducted into the bottom portion 55 of the LCD housing 50 until the light is eventually directed toward the rear surface 72 of the LCD module 70. Since all internal reflections will inherently have a lossy effect on the incident light, the junction of the rear portion 54 and the bottom portion 55 of the LCD housing 50 may be geometrically shaped so that light is reflected into the rear portion 54 with a minimum amount of internal reflections. In this embodiment, the light source 62 need not be enclosed in the LCD housing 50 to the extent of the cold cathode fluorescent lamp 60 of FIG. 5. In situations where a greater thickness d7 is required to protect the light source 62, the light source 62 may be enclosed in the LCD housing 50 at a variety of depths.

Figure 7:
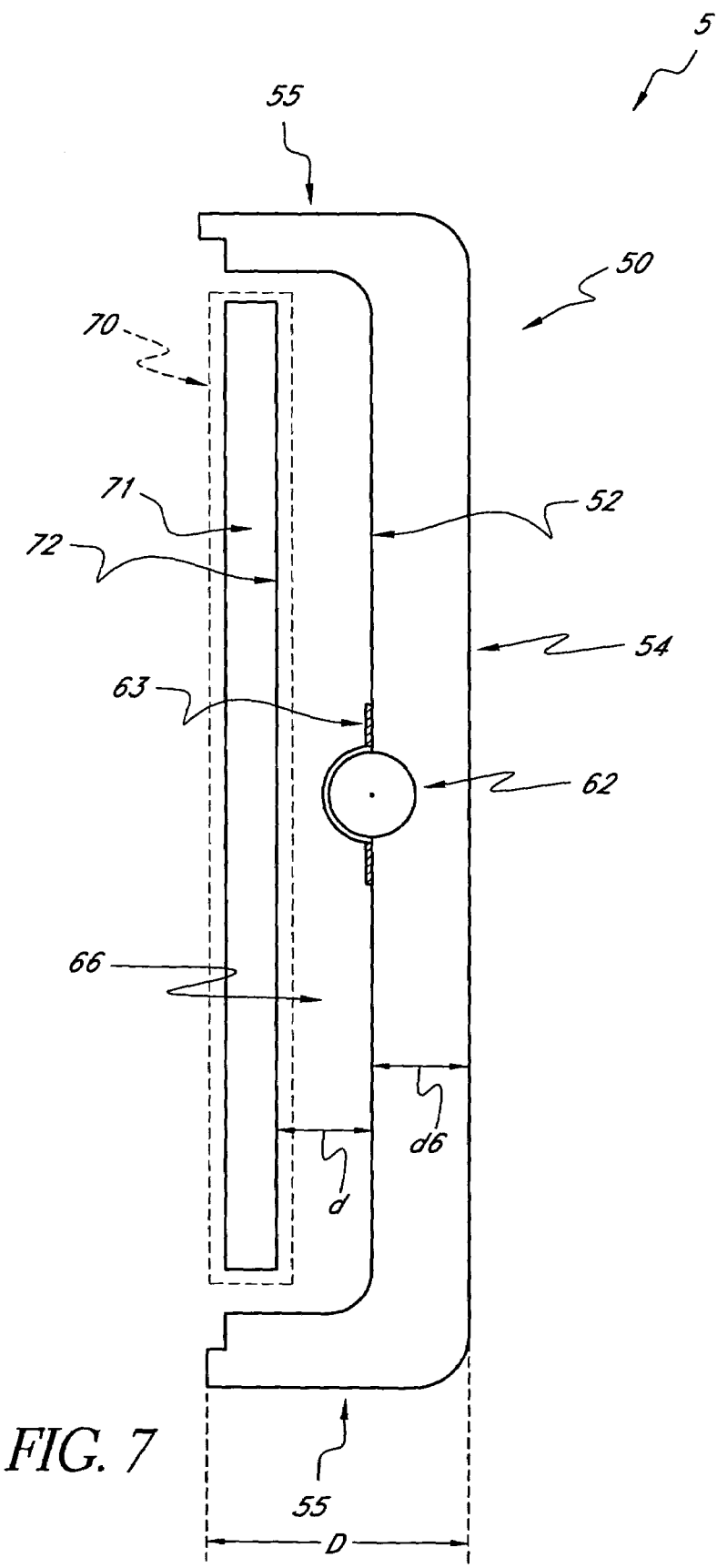
FIG. 7 is a cross sectional view of an alternative embodiment of the present invention.

Still another embodiment of the present invention is shown in FIG. 7. In this embodiment, the light source 62 and the reflector 63 may be located in the middle of the rear portion 54 of the LCD housing 50. The light source 62 may be partially enclosed in the LCD housing 50. The protrusion of the light source 62 (and the reflector 63) from the LCD housing 50 creates a gap 66 between the rear surface 72 of the LCD module 70 and the inner surface 52 of the LCD housing 50. This results in a larger gap 66 than required solely to accommodate the protrusion of the light source 62 from the LCD housing 50.

The gap 66 may be purposely designed into the fliptop display 5 as a design tradeoff between depth D and lighting efficiency. While the depth D of the fliptop display 5 will be increased, lighting efficiency may be improved. The addition of the gap 66 will provide the light with a greater depth d in which to diffuse before being incident upon the rear surface 72 of the LCD 71. This may provide better illumination of the LCD 71 toward the top and bottom portions 55 of the LCD housing 50.

Figure 8:
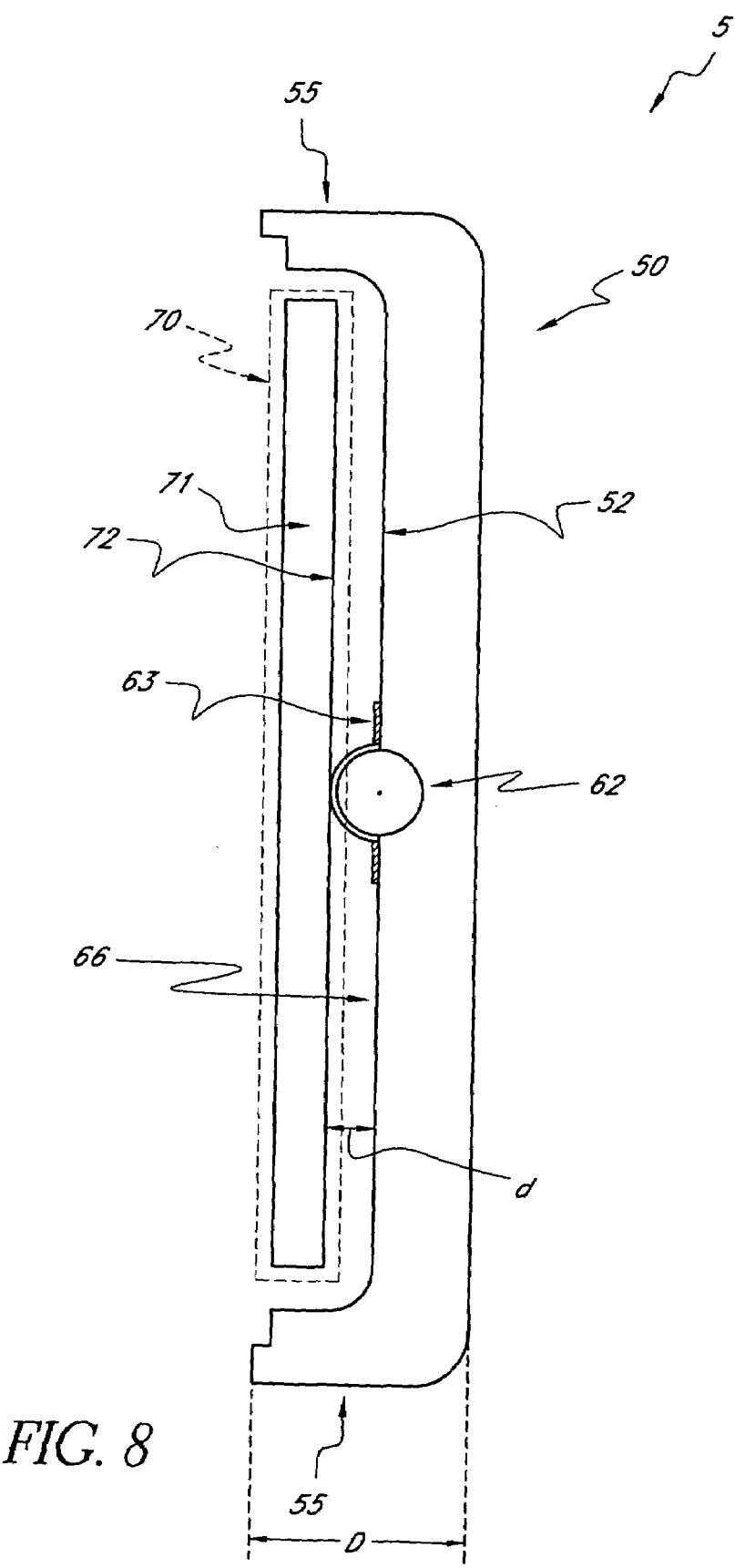
FIG. 8 is a cross-sectional view of an alternative embodiment of a computer display.

Yet another embodiment is shown in FIG. 8. In this embodiment, the thickness d6 of the rear portion 54 of the LCD housing 50 in FIG. 7 may be increased in order to strengthen the LCD housing 50. For example, using the typical dimensions previously discussed for the various fliptop display components, the thickness d6 may be increased up to 2 mm before the fliptop display 5 has the same depth D as in the prior art. As shown in FIG. 8, the depth d of the gap 66 is correspondingly reduced.

In yet another embodiment, the LCD housing 50 can be designed to display a variety of ornamental effects. In this embodiment, areas of the light-reflective coating 53 can be masked or removed by scoring or by etching so that light incident upon these areas is no longer reflected back into the LCD housing 50, but instead is conducted out of the LCD housing 50. The protective layer 56 would also typically be similarly scored or etched in order to allow the light to leave the LCD housing 50. In this manner, text, company logos, trademarks, or other designs may be illuminated.

With respect to the embodiments described herein, it can be seen that the present inventions incorporation of the light pipe function into the LCD housing provides the laptop computer designer with greater design flexibility. The potential reduction in depth D of the fliptop display provides the laptop computer designer with a variety of configurations for the light source, LCD, and LCD housing assembly. The laptop computer designer may configure these components in a variety of ways resulting in a fliptop display depth D that is less than or equal to the width of the prior art fliptop display assembly. Additionally, the size and/or weight of the LCD module may substantially reduced. While this design flexibility has been demonstrated in the description of the preferred embodiments, it is clear that many other modifications, changes, variations, and substitutions are within the scope of this invention.

What is claimed is:

1. An assembly for illuminating and protecting a liquid crystal display (LCD), the assembly comprising:
    a housing made from a single light transmissive material, wherein the housing is configured to be coupled to a LCD;
    a light source substantially embedded in the housing, wherein the housing is further configured to function as a light pipe for conducting light from the light source to the LCD; and
    a reflective coating on at least a portion of a surface of the housing, wherein at least a portion of light from the light source is reflected by the reflective coating.

2. The assembly of claim 1, wherein the light source comprises a fluorescent lamp.

3. The assembly of claim 2, wherein the fluorescent lamp comprises an aperture positioned adjacent the housing.

4. The assembly of claim 1, wherein the light source comprises an omnidirectional light source.

5. The assembly of claim 1, wherein the single light transmissive material has the same light transmissive characteristics throughout.

6. The assembly of claim 5, wherein the housing is formed in a single piece of the single light transmissive material.

7. The assembly of claim 1, wherein the housing has a thickness of approximately four millimeters.

8. The assembly of claim 1, wherein a portion of the light source protrudes from the housing.

9. The assembly of claim 1, wherein the single light transmissive material comprises plastic.

10. A method for illuminating a display, the method comprising:
    generating light from at least one light source substantially enclosed within a display housing at least partially coated with a reflective material; and
    conducting the generated light through the display housing directly to a display, wherein the display housing is made of a single translucent material configured to function as a light pipe for illuminating the display, and wherein the display housing is further configured to protect the display.

11. The method of claim 10, wherein the at least one light source comprises a cold cathode fluorescent lamp.

12. The method of claim 10, wherein the display comprises a liquid crystal display.

13. The method of claim 10, wherein the display housing is made from a single piece of the single translucent material.

14. The method of claim 13, wherein the single translucent material has the same light transmissive characteristics throughout.

15. The method of claim 10, additionally comprising allowing a portion of the generated light to leave the display housing through etched portions of the reflective material.

16. An assembly for illuminating and protecting a display, the assembly comprising:
    means for housing and coupling to a display, said housing and coupling means being constructed from a single light transmissive material;
    means for generating light for the display, wherein said generating means is substantially embedded in said housing and coupling means, said housing and coupling means structured to function as a light pipe to conduct light from said generating means directly to the display; and
    means for reflecting at least a portion of the light from the generating means, wherein said reflecting means coats at least a portion of a surface of said housing and coupling means.

17. The assembly of claim 16, wherein said housing and coupling means is made from a single piece of the single light transmissive material.

18. The assembly of claim 16, wherein said housing and coupling means protects at least three sides of the display.

19. The assembly of claim 16, wherein the display comprises a liquid crystal display.

20. The assembly of claim 16, further comprising means for coupling the housing and coupling means to a laptop body.

* * * * *

UNITED STATES PATENT AND TRADEMARK OFFICE
CERTIFICATE OF CORRECTION

PATENT NO. : 7,630,024 B2  Page 1 of 1
APPLICATION NO. : 11/520225
DATED : December 8, 2009
INVENTOR(S) : Dean A. Klein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 310 days.

Signed and Sealed this

Second Day of November, 2010

David J. Kappos
*Director of the United States Patent and Trademark Office*